United States Patent
Blechschmidt et al.

(10) Patent No.: US 7,054,124 B2
(45) Date of Patent: May 30, 2006

(54) METHOD FOR SWITCHING OVER A REFERENCE VOLTAGE POTENTIAL FOR OVERVOLTAGE PROTECTION DEVICES

(75) Inventors: Klaus Blechschmidt, Ilmmünster (DE); Bernhard Zojer, Villach (AT)

(73) Assignee: Infineon Technologies AG, Munich (DE)

( * ) Notice: Subject to any disclaimer, the term of this patent is extended or adjusted under 35 U.S.C. 154(b) by 201 days.

(21) Appl. No.: 10/478,772

(22) PCT Filed: May 15, 2002

(86) PCT No.: PCT/EP02/05357

§ 371 (c)(1),
(2), (4) Date: Nov. 21, 2003

(87) PCT Pub. No.: WO02/096080

PCT Pub. Date: Nov. 28, 2002

(65) Prior Publication Data

US 2004/0136132 A1 Jul. 15, 2004

(30) Foreign Application Priority Data

May 21, 2001 (DE) .............................. 101 24 965

(51) Int. Cl.
*H02H 3/20* (2006.01)
*H02H 9/04* (2006.01)
(52) U.S. Cl. .................. 361/91; 361/56; 361/91.1; 361/111; 361/118
(58) Field of Classification Search .................. 361/91, 361/56
See application file for complete search history.

(56) References Cited

U.S. PATENT DOCUMENTS 5,280,455 A * 1/1994 Kanaishi ..................... 365/229
5,596,637 A 1/1997 Pasetti et al.
6,172,864 B1 1/2001 Bremond et al.

FOREIGN PATENT DOCUMENTS

| EP | 0 622 943 A1 | 4/1993 |
| EP | 0 798 910 A1 | 10/1997 |
| JP | 06054356 A | 2/1994 |
| WO | WO 99/290098 | 6/1999 |

* cited by examiner

*Primary Examiner*—Phuong T. Vu
*Assistant Examiner*—Dharti H. Patel
(74) *Attorney, Agent, or Firm*—Maginot, Moore & Beck

(57) ABSTRACT

Method for supplying a circuit unit (201) which is to be supplied with different supply voltages, in which the circuit unit (201) to be supplied is protected against overvoltages, having the following steps: application of at least two supply voltages (203a, 203b) with respect to a ground potential (210) to the circuit unit (201) to be supplied; connection of signal connections (208, 209) of the circuit unit (201) to signal lines (206, 207) for transmission of signals between the circuit unit (201) and external circuit units; emission of a reference voltage (204) from a control connection (212) of the circuit unit (201) to an overvoltage protective device (205), in that a supply voltage (203a, 203b) is passed on to the control connection (212) by means of a switching module (211); and tripping of the overvoltage protective device (205) on detection of an overvoltage which occurs with respect to the reference voltage (204) on at least one of the two signal lines (206, 207).

14 Claims, 2 Drawing Sheets

METHOD FOR SWITCHING OVER A REFERENCE VOLTAGE POTENTIAL FOR OVERVOLTAGE PROTECTION DEVICES

The present invention relates to a method for supplying a circuit unit to be supplied and to a protective device, and relates in particular to a method for supplying a circuit unit to be supplied with different supply voltages, in which the circuit unit to be supplied is protected against overvoltages.

According to the prior art, various circuit units are known which are operated with at least one supply voltage, which is provided for supplying power, with respect to a ground potential. Circuit units to be supplied are operated, for example, with at least one negative supply voltage with respect to a ground potential, and/or at least one positive supply voltage with respect to a ground potential.

Subscriber line interface circuit (SLIC) units in particular are currently operated with at least one negative supply voltage and in general with a positive supply voltage. Subscriber line interface circuit units generally react sensitively to overvoltages which are introduced, for example, via an a/b line (Tip-Ring line) to the SLIC, with the expression overvoltage being defined in the relevant regulations and standards (for example ITU-T regulations). These documents define in particular the magnitude of the overvoltages which are permissible at what time and for what time period.

Figure 1:
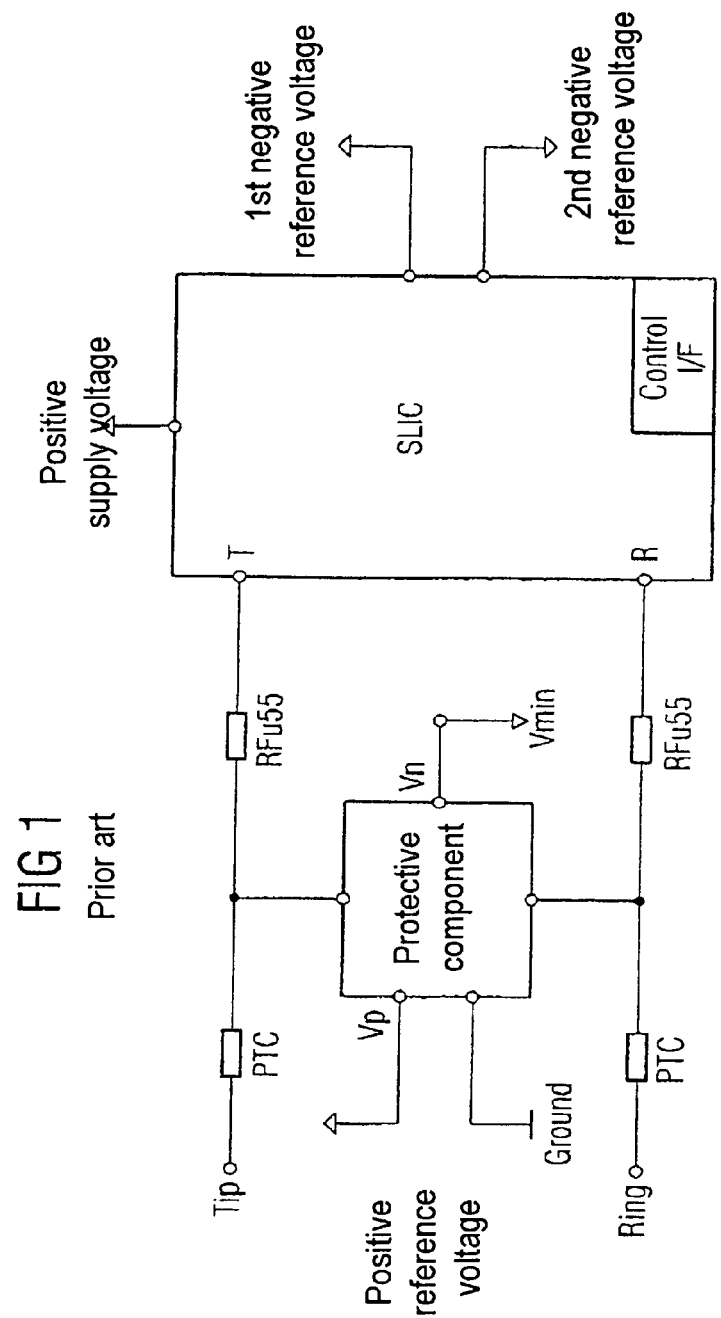

FIG. 1 shows a conventional circuit arrangement for supplying a circuit unit to be supplied with supply voltages and which is referred to in FIG. 1 as an SLIC subscriber line interface circuit. In the circuit arrangement according to the prior art as shown in FIG. 1, two different negative supply voltages are applied to the SLIC, and these are referred to as the first negative reference voltage and as the second negative reference voltage.

Switching between the two negative reference voltages for supplying the SLIC to be supplied depends on the operating conditions of the SLIC. For example, in order to reduce the power consumption or in order to reduce power losses, it may be necessary to switch from a relatively high first negative reference voltage to a relatively low second negative reference voltage. This switching is carried out by a control unit (Control I/F).

It should be mentioned that the two reference voltages assume a different negative potential with respect to a ground potential. In order to protect the signal connections (R, T) of the SLIC against overvoltages, a protective apparatus is arranged in the conventional manner between an a/b line pair, which is referred to in FIG. 1 as Tip/Ring (a Tip/Ring line pair) and the signal connections R, T of the SLIC. Two resistance elements (PTC and RFuse) are in each case connected in series between one conductor of the line pair Tip/Ring and the respective signal connection of the SLIC in order to limit any current which enters the signal connections R, T and in order to provide protection against overcurrents.

The resistance elements $R_{Fuse}$ are used for current limiting, while the resistance element PTC may be in the form of a temperature-dependent resistance element, of a protective resistor or of a fuse.

A conventional protective component is connected between the junction point of the resistors PTC and RFuse which are connected in series between the tip conductor and the T signal connection SLIC, and the junction point of the resistors PTC and RFuse which are connected in series between the ring conductor and the R signal connection of the SLIC and this protective component connects the appropriate junction point to ground in a predetermined time when overvoltages occur at one of the junction points.

The protective component is operated with a positive supply voltage (positive reference voltage) Vp and with a negative supply voltage Vn, and is also connected to ground. In order to define what voltage is intended to be defined as an overvoltage, a reference voltage signal is required, which is supplied to the protective component via its connections Vp and Vn. In a circuit arrangement according to the prior art, this reference voltage signal Vmin must be predetermined externally, thus, in particular, then endangering the operational reliability of the SLIC when the control unit Control I/F for the SLIC switches from, for example, a first negative reference voltage to a second negative reference voltage.

As can clearly be seen, when switching takes place between two negative reference voltages, the reference voltage signal Vmin which is applied to the input Vn of the protective component is not varied, and may thus assume a value which is not suitable for protection of the SLIC.

One disadvantage of a conventional circuit arrangement is thus that an SLIC cannot exclusively and on its own be protected reliably against overvoltages by means of a protective component when a power supply for the SLIC switches between different (positive or negative) supply voltages.

In order to protect an SLIC, methods according to the prior art monitor specific states of the a/b (Tip/Ring) conductor by means of a microcontroller unit, a processor unit and/or an integrated digital signal processor.

When a state (for example an overvoltage) which is relevant for tripping of the protective component occurs, a further component in the SLIC must be switched via the microcontrol unit, the processor unit and/or the integrated digital signal processor to a mode in which the SLIC cannot be destroyed by the state that has occurred.

One disadvantage of this conventional method is that a combination of an SLIC with a protective component is not on its own suitable for protection of the SLIC, but that further circuit components must be provided for reliable protection.

A further disadvantage of a conventional circuit arrangement for protection of an SLIC is that additional circuit components (microcontroller unit, processor unit, integrated digital signal processor) are required, and this reduces the reliability of the circuit arrangement.

One object of the present invention is thus to provide a method and a circuit arrangement for supplying a circuit unit to be supplied with different supply voltages, in which the circuit unit to be supplied is protected with the aid of an overvoltage protective device without any additional components.

According to the invention, this object is achieved by the method specified in Claim 1 and by a circuit arrangement having the features of Claim 9.

Advantageous developments and improvements of the respective subject matter of the invention can be found in the dependent claims.

The essence of the invention is a method for supplying a circuit unit to be supplied with different supply voltages, in which the circuit unit to be supplied is always reliably protected against overvoltages in that at least one supply voltage is passed on by means of a switching module to a reference voltage connection of an overvoltage protective device.

The method according to the invention as claimed in Claim 1 and the circuit arrangement having the features of Claim 9 have the advantage that a circuit unit to be supplied is protected against overvoltages, in that an overvoltage protective device is connected to the circuit unit to be supplied without any additional components being required such as microcontroller units, processor units and/or integrated digital signal processors.

The method according to the invention for supplying a circuit unit to be supplied with different supply voltages essentially has the following steps:

a) application of at least two supply voltages with respect to the ground potential to the circuit unit to be supplied;

b) connection of signal connections of the circuit unit, to be supplied, to signal lines for transmission of signals between the circuit unit to be supplied and external circuit units, with in particular a connection between a transmission line connection and an externally supplied a/b (Tip/Ring) line pair being provided;

c) emission of a reference voltage from a control connection of the circuit unit, to be supplied, to an overvoltage protective device, in that a supply voltage is passed on to the control connection by means of a switching module integrated into the switching unit to be supplied; and d) tripping of the overvoltage protective device on detection of an overvoltage which occurs with respect to the reference voltage on at least one of the two signal lines.

According to one preferred development of the present invention, the reference voltage signal which is emitted from the control connection of the circuit unit, to be supplied, to the overvoltage protective device is derived from at least one supply voltage by means of the switching module.

According to a further preferred development of the present invention, the reference voltage signal which is emitted from the control connection of the circuit unit, to be supplied, to the overvoltage protective device is derived from at least one further supply voltage with opposite polarity by means of the switching module.

According to a first embodiment of the present invention, the switching module passes on as the reference voltage a negative supply voltage which is applied to the circuit unit to be supplied.

According to another alternative embodiment of the present invention, the switching module passes on as the reference voltage a positive supply voltage which is applied to the circuit unit to be supplied.

According to yet another further preferred development of the present invention, at least one overvoltage which occurs between the overvoltage detection connections of the overvoltage protective device and the ground potential is dissipated to the ground potential.

According to yet another further preferred development of the present invention, temperature-dependent resistance elements which are connected between the transmission line connections and the signal connections of the circuit unit to be supplied have positive temperature coefficients, as a result of which the circuit unit to be supplied is protected in the event of a defect as a consequence of a temperature increase. Furthermore, the temperature-dependent resistance elements may be in the form of protective resistance elements corresponding to fuses.

According to yet another further preferred development of the present invention, resistance elements are connected in series with the temperature-dependent resistance elements, as a result of which the circuit unit to be supplied is protected in the event of a defect resulting from an overcurrent.

Figure 2:
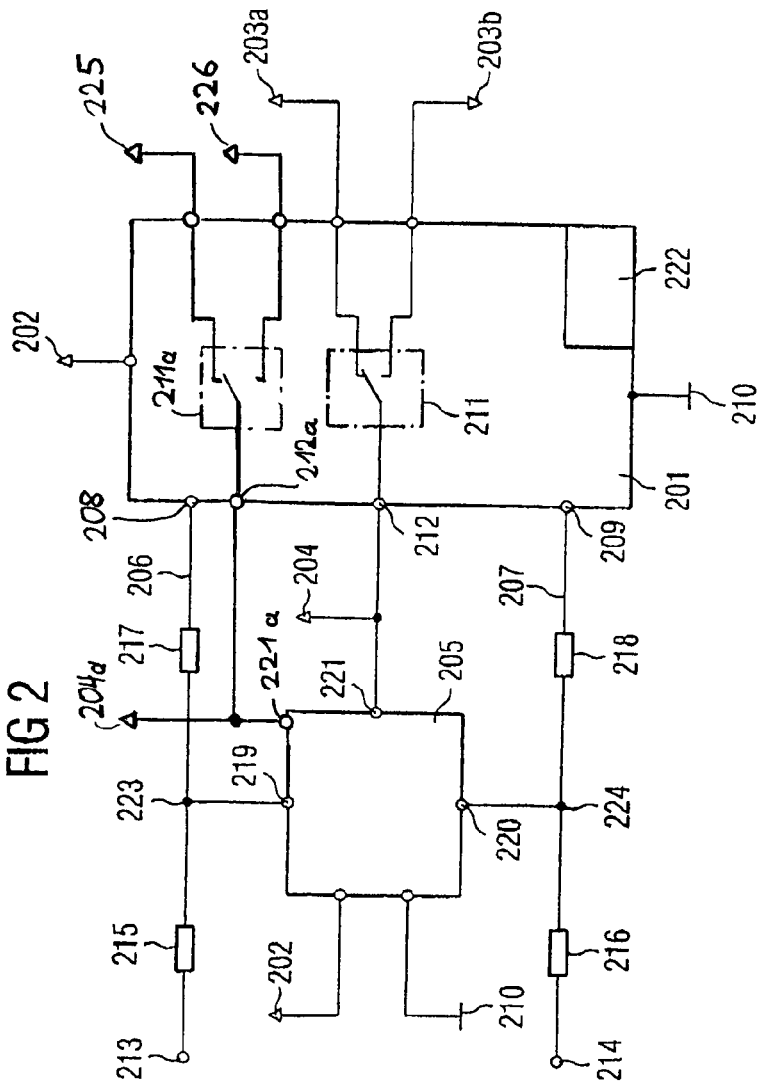

Exemplary embodiments of the invention will be explained in more detail in the following description and are illustrated in the drawings, in which:

FIG. 1 shows a conventional circuit arrangement for supplying a circuit unit to be supplied with two negative reference voltages and with a positive supply voltage, as well as a protective component; and FIG. 2 shows a circuit arrangement for supplying a circuit unit to be supplied, according to one exemplary embodiment of the present invention.

In the circuit arrangement illustrated in FIG. 2, a circuit unit 201 to be supplied is connected to a ground potential 210, to a positive supply voltage 202 and to two negative supply voltages 203a, 203b.

It should be mentioned that there may be more than one positive supply voltage 202 and more than two negative supply voltages 203a, 203b. In order to reduce power losses and for matching or for adjustment of the power consumption, the circuit unit 201 to be supplied may be supplied with different supply voltages 202, 203a, 203b with respect to a ground potential 210.

In the exemplary embodiment of the present invention illustrated in FIG. 2, the circuit unit 201 to be supplied is supplied with a fixed positive supply voltage 202 and, optionally, with two negative supply voltages 203a and 203b.

Transmission lines 206, 207 to the circuit unit 201 to be supplied which, for example, may be in the form of a subscriber line interface circuit (SLIC) are connected to transmission line connections 213, 214 (transmission lines and a/b (Tip/Ring) line pairs have been omitted from FIG. 2 for reasons of clarity). The transmission line connection 213 is connected via two series-connected resistance elements (which are illustrated for the sake of example as a temperature-dependent resistance element 215 and a resistance element 217) to a signal connection 208 of the circuit unit 201 to be supplied.

In the same way, the transmission line connection 214 in this exemplary embodiment is connected to a signal connection 209 via a temperature-dependent resistance element 216 and a resistance element 218 connected in series. Resistance element connections between the respective temperature-dependent resistance element 215 or 216 and the resistance element 217 or 218 form resistance element connections 223 and 224, respectively, to which overvoltage detection connections 219 and 220, respectively, of an over-voltage protective device 205 are connected.

The overvoltage protective device 205 is preferably supplied with respect to the ground potential 210 with a positive supply voltage 202 and a negative supply voltage, which is provided as the reference voltage signal 204.

The overvoltage protective device 205 connects the potential at the overvoltage detection connections 219 and 220, respectively, to the ground potential 210 when overvoltages occur at the resistance element connections 223 and 224, respectively, of the signal lines 206, 207. These overvoltages are detected with reference to a reference voltage signal 204, 204a which is to be supplied to a reference voltage connection 221 and 221a, respectively.

This means that no damaging overvoltages reach the signal connections 208 and 209, respectively, via the respective signal lines 206 and 207, and that the circuit unit 201 is not destroyed by overvoltages. As is shown in the exemplary embodiment of the present invention that is illustrated in FIG. 2, the circuit unit 201 to be supplied contains a switching module 211, which is switched by means of the circuit unit 201 to be supplied such that only one, for example negative, supply voltage 203a, 203b is in each case passed on to a control connection 212.

A reference voltage signal 204 is thus produced at the control connection 212 and is supplied to the overvoltage protective device 205 via its reference voltage connection 221. The switching module 211 means that the respectively used supply voltage 203a or 203b is used as the reference voltage signal 204 for the overvoltage protective device 205. It is thus possible to operate the circuit unit 201 to be supplied with different supply voltages 203a, 203b without adversely affecting the operational reliability of the overvoltage protection, which is provided by the overvoltage protective device, where changing from a first supply voltage to a further supply voltage.

Further protection for the circuit unit 201 to be supplied is achieved by means of the series-connected resistance elements 215 and 217, as well as 216 and 218. The two resistance elements 215 and 216 are used in the present exemplary embodiment for protection of the circuit in the event of an overvoltage, while the two resistance elements 217 and 218 provide protection for the circuit unit 201 to be supplied in the event of overcurrents on the two signal lines 206 and 207. A mode switching module 222 is used to drive the switching module 211 and is arranged within the circuit unit 201 to be supplied, ensuring that the circuit unit 201 can be switched to the respectively used negative supply voltage 203a or 203b.

It should be mentioned that it is optionally possible to switch between different positive supply voltages 225, 226 and between different negative supply voltages 203a, 203b. In this case, the at least two positive supply voltages 225, 226 are passed on via a second switching module 211a to a second control connection 212a of the circuit unit 201 to be supplied, with the respective positive supply voltage 225, 226 being passed from the second control connection 212a as a supply voltage 204a to the overvoltage protective device (not shown in FIG. 2).

The switching module 211 may also be integrated in the circuit unit 201 to be supplied, in which case the switching module is driven via the mode switching module 222, which is likewise integrated, so that the reference voltage signal 204 can be produced at a pin, that is to say the control connection 212, of the circuit unit 201 to be supplied. Furthermore, the mode switching module 222 and the switching module 211 may be integrated in one unit, thus ensuring that the overvoltage protective device 205 is driven effectively. The overvoltage protective device 205 is arranged symmetrically with respect to the signal connections 208 and 209 of the circuit unit 201 to be supplied, that is to say it is arranged symmetrically between the resistance element connections 223 and 224, in order to protect both signal connections 208 and 209 against any overvoltages that occur.

The passive control according to the invention of the overvoltage protective device 205 ensures effective protection of the circuit unit 201 to be supplied, which is operated with two or more supply voltages.

LIST OF REFERENCE SYMBOLS

Identical reference symbols denote identical or functionally identical components in the figures;
201 Circuit unit to be supplied
202 Positive supply voltage
203a, 203b Negative supply voltage
204 Reference voltage signal
205 Overvoltage protective device
206, 207 Signal line
208, 209 Signal connection
210 Ground potential
211 Switching module
212 Control connection
213, 214 Transmission line connection
215, 216 Temperature-dependent resistance element
217, 218 Protection resistance element
219, 220 Overvoltage detection connection
221 Reference voltage connection
222 Mode switching module
223, 224 Resistance element connection

The invention claimed is:

1. A method comprising:
a) providing at least two supply voltages with respect to a ground potential to a circuit unit;
b) connecting signal connections of the circuit unit to signal lines for transmission of signals between the circuit unit and one or more external circuit units;
c) propagating a reference voltage from a control connection of the circuit unit to an overvoltage protective device, the overvoltage protective device connected symmetrically to two resistance element connections of the signal lines;
d) propagating a second reference voltage signal from a second control connection of the circuit unit to the overvoltage protective device, the second reference voltage signal derived from at least two further supply voltages with opposite polarity by means of a second switching module;
e) tripping the overvoltage protective device responsive to detection of an overvoltage on at least one of the two signal lines with respect to the reference voltage, thereby causing the overvoltage protection device to dissipate the overvoltage to the ground potential,
f) switching the circuit unit to select one of the at least two supply voltages using a mode switching module that is integrated in the circuit unit,
and wherein the reference voltage depends on the selected one of the at least two supply voltages.

2. The method of claim 1, wherein c) further comprises employing a switching module to propagate the reference voltage.

3. The method of claim 1 wherein c) further comprises employing a switching module to propagate the reference voltage, the reference voltage comprising the selected one of the at least two supply voltages.

4. The method of claim 3 wherein the selected one of the at least two supply voltages is a negative voltage.

5. The method of claim 3 wherein the selected one of the at least two supply voltages is a positive voltage.

6. The method of claim 1 wherein step c) further comprises propagating the reference voltage from the control connection of the circuit unit to the overvoltage protective device, the overvoltage protective device further connected symmetrically to two temperature-dependent resistance elements having positive temperature coefficients.

7. The method of claim 1 wherein step c) further comprises propagating the reference voltage from the control connection of the circuit unit to the overvoltage protective device, the overvoltage protective device further connected symmetrically to two temperature-dependent resistance elements having positive temperature coefficients, each of the two temperature-dependent resistance elements connected in series with a corresponding of the two resistance element connections.

8. A circuit arrangement for supplying voltage to a circuit unit and having overvoltage protection, the circuit arrangement comprising:

a) at least one voltage source for provision of at least two supply voltages, which are related to a ground potential, with respect to a ground potential for the circuit unit to be supplied;
b) an overvoltage protective device connected symmetrically to two resistance connections of the signal lines, the overvoltage protection device configured to trip upon detection of an overvoltage which occurs with respect to a reference voltage on at least one signal line of the circuit unit;
c) a switching module for providing the reference voltage to the overvoltage protection device, the reference voltage corresponding to a select one of the at least two supply voltages;
d) a second switching module configured to propagate a second reference voltage signal from a second control connection of the circuit unit to the overvoltage protective device, the second reference voltage signal derived from at least two further supply voltages with opposite polarity by means of a second switching module; and
e) a mode switching module integrated into the circuit unit and configured to switch the circuit unit to the select one of the at least two supply voltages.

9. The circuit arrangement according to claim 8, wherein the switching module is integrated in the circuit unit.

10. The circuit arrangement of claim 8 wherein the switching module is operable to propagate the selected one of the at least two supply voltages as the reference voltage.

11. The circuit arrangement of claim 10 wherein the selected one of the at least two supply voltages is a negative voltage.

12. The circuit arrangement of claim 10 wherein the selected one of the at least two supply voltages is a positive voltage.

13. The circuit arrangement of claim 8 wherein the overvoltage protective device is further connected symmetrically to two temperature-dependent resistance elements having positive temperature coefficients.

14. The circuit arrangement of claim 8 the overvoltage protective device is further connected symmetrically to two temperature-dependent resistance elements having positive temperature coefficients, each of the two temperature-dependent resistance elements connected in series with a corresponding of the two resistance element connections.

* * * * *